United States Patent
Sakamoto

(10) Patent No.: US 12,249,940 B2
(45) Date of Patent: Mar. 11, 2025

(54) MOTOR

(71) Applicant: Panasonic Intellectual Property Management Co., Ltd., Osaka (JP)

(72) Inventor: Mitsuhiro Sakamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 18/042,789

(22) PCT Filed: Jul. 7, 2021

(86) PCT No.: PCT/JP2021/025568
§ 371 (c)(1),
(2) Date: Feb. 24, 2023

(87) PCT Pub. No.: WO2022/049889
PCT Pub. Date: Mar. 10, 2022

(65) Prior Publication Data
US 2023/0318510 A1    Oct. 5, 2023

(30) Foreign Application Priority Data
Sep. 4, 2020 (JP) ................. 2020-149426

(51) Int. Cl.
*H02P 1/30* (2006.01)
*H02P 23/24* (2016.01)
*H02P 27/08* (2006.01)

(52) U.S. Cl.
CPC ............ *H02P 27/085* (2013.01); *H02P 23/24* (2016.02)

(58) Field of Classification Search
CPC ........ H02P 27/085; H02P 23/24; H02P 27/08; H02P 6/30; H02P 27/06; H02P 27/04; H02P 3/22
See application file for complete search history.

(56) References Cited

U.S. PATENT DOCUMENTS 10,895,603 B2 *   1/2021  Kiuchi ............... B60L 3/04
2021/0140441 A1   5/2021  Sakamoto et al.

FOREIGN PATENT DOCUMENTS

CN    110557042 A  * 12/2019 .......... H02M 7/5395
WO    2020/008924     1/2020

OTHER PUBLICATIONS

International Search Report of PCT application No. PCT/JP2021/025568 dated Aug. 31, 2021.

* cited by examiner

*Primary Examiner* — Karen Masih
(74) *Attorney, Agent, or Firm* — Rimon P.C.

(57) ABSTRACT

A motor including a first terminal and a second terminal to which a single-phase AC is input includes a third terminal, an AC/DC converter that converts a single-phase AC into a DC, an inverter that is PWM-controlled by a PWM signal to convert the DC into a three-phase AC, a controller that outputs a PWM signal to the inverter, and a detection circuit connected to the third terminal, in which the detection circuit outputs any one of a first detection signal, a second detection signal, and a third detection signal, and the controller outputs a PWM signal to be in a first rotation state when the detection circuit outputs the first detection signal, to be in a second rotation state when the detection circuit outputs the second detection signal, and to be in a third rotation state when the detection circuit outputs the third detection signal.

4 Claims, 11 Drawing Sheets

MOTOR

CROSS-REFERENCE TO RELATED APPLICATIONS

This application is a U.S. national stage application of the PCT International Application No. PCT/JP2021/025568 filed on Jul. 7, 2021, which claims the benefit of foreign priority of Japanese patent application No. 2020-149426 filed on Sep. 4, 2020, the contents all of which are incorporated herein by reference.

TECHNICAL FIELD

The present disclosure relates to motors.

BACKGROUND ART

Conventionally, a motor including a pair of terminals for power source is known (see, for example, PTL 1).

In general, a motor is desired to have a relatively small number of terminals. Therefore, in a motor capable of dynamically switching a plurality of operation modes having different rotation states, there is a demand for suppressing the number of terminals for dynamically switching the operation modes.

CITATION LIST

Patent Literature

PTL 1: WO 2020/008924 A

SUMMARY OF THE INVENTION

Therefore, the present disclosure is a motor capable of dynamically switching among three operation modes having different rotation states. An object of the present disclosure is to provide a motor including one terminal in addition to a pair of terminals for power source.

A motor according to one aspect of the present disclosure includes: a first terminal and a second terminal to which a single-phase AC is input; a third terminal; an AC/DC converter that is connected to the first terminal and the second terminal and converts the single-phase AC into a DC; an inverter configured to convert the DC into a three-phase AC by performing pulse width modulation control (PWM control) using a pulse width modulation signal (PWM signal); a winding wire to which the three-phase AC is supplied; a rotor configured to rotate by a magnetic field generated in the winding wire; a controller configured to output the PWM signal to the inverter; and a detection circuit that is connected to the third terminal. In a state where the single-phase AC is input to the first terminal and the second terminal, the detection circuit (1) outputs a first detection signal when the third terminal is short-circuited to the first terminal, (2) outputs a second detection signal when the third terminal is short-circuited to the second terminal, and (3) outputs a third detection signal when the third terminal is in an open state. The controller outputs the PWM signal, the rotor being in a first rotation state when the detection circuit outputs the first detection signal, the rotor being in a second rotation state when the detection circuit outputs the second detection signal, and the rotor being in a third rotation state when the detection circuit outputs the third detection signal.

With the above configuration, there is provided a motor capable of dynamically switching among three operation modes having different rotation states, the motor including one terminal in addition to a pair of power source terminals.

DESCRIPTION OF EMBODIMENT

Figure 1:
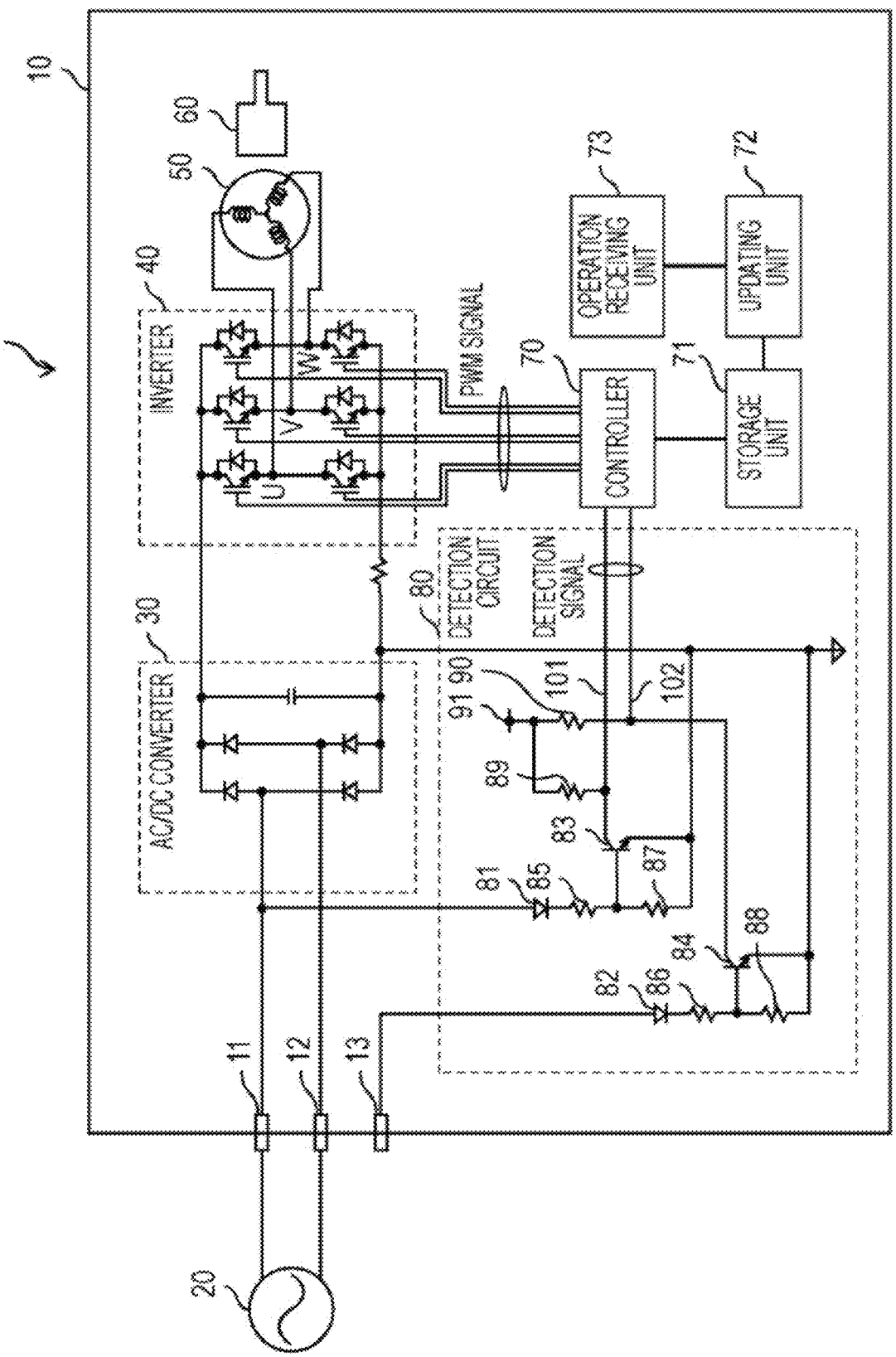
FIG. 1 is a block diagram illustrating a configuration example of a motor drive system according to a first exemplary embodiment.

Background of Obtaining One Aspect of Present Disclosure

Conventionally, a motor is used in a cooling device (for example, a freezing showcase or the like) for cold chain use that handles products in a cooled state.

In the cooling device, it is necessary to dynamically switch the operation mode of the motor in order to realize the air volume switching operation, the switching operation to the defrosting operation, and the like. For example, the air volume switching operation is realized by dynamically switching operation modes of the motors having different rotation speeds. For example, the switching operation to the defrosting operation is realized by dynamically switching the operation modes of the motors having different rotation directions.

On the other hand, the motor used in the cooling device is desired to have a relatively small number of terminals.

Therefore, the inventors have intensively conducted experiments and studies on a configuration capable of suppressing the number of terminals other than the pair of power source terminals in the motor capable of dynamically switching the operation modes different from each other. As a result, the following motor has been conceived.

A motor according to one aspect of the present disclosure includes: a first terminal and a second terminal to which a single-phase AC is input; a third terminal; an AC (Alternating Current)/DC (Direct Current) converter that is connected to the first terminal and the second terminal and converts the single-phase AC into a DC; an inverter configured to convert the DC into a three-phase AC by performing PWM (Pulse Width Modulation) control using a PWM signal; a winding wire to which the three-phase AC is supplied; a rotor configured to rotate by a magnetic field generated in the winding wire; a controller configured to output the PWM signal to the inverter; and a detection circuit that is connected to the third terminal. In a state where the single-phase AC is input to the first terminal and the second terminal, the detection circuit (1) outputs a first detection signal when the third terminal is short-circuited to the first terminal, (2) outputs a second detection signal when the third terminal is short-circuited to the second terminal, and (3) outputs a third detection signal when the third terminal is in an open state. The controller outputs the PWM signal, the rotor being in a first rotation state when the detection circuit outputs the first detection signal, the rotor being in a second rotation state when the detection circuit outputs the second detection signal, and the rotor being in a third rotation state when the detection circuit outputs the third detection signal.

According to the motor having the above configuration, (1) the third terminal is short-circuited to the first terminal, whereby the rotor enters the first rotation state, (2) the third terminal is short-circuited to the second terminal, whereby the rotor enters the second rotation state, and (3) the third terminal is in an open state, whereby the rotor enters the third rotation state. As described above, according to the motor having the above configuration, there is provided a motor capable of dynamically switching among three operation modes having different rotation states, the motor including one terminal (that is, the third terminal) in addition to the pair of power source terminals (that is, the first terminal and the second terminal).

The first rotation state, the second rotation state, and the third rotation state may include at least a rotation state in which the rotor rotates in a first rotation direction and a rotation state in which the rotor rotates in a second rotation direction opposite to the first rotation direction.

As a result, the motor having the above configuration can operate in operation modes in which the rotation directions of the rotor are opposite to each other.

Further, a storage part that stores PWM information defining a waveform of the PWM signal, an updating part that updates the PWM information, and an operation receiving part that receives an operation of the motor from the user are provided. The controller may output the PWM signal on the basis of the PWM information, and the updating part may update the PWM information on the basis of the operation from the user received by the operation receiving part.

Thus, the motor having the above configuration can operate in the operation mode set by the user.

Hereinafter, a specific example of a motor according to an aspect of the present disclosure will be described with reference to the drawings. Note that the exemplary embodiments described below each illustrate a specific example of the present disclosure. Numerical values, shapes, constituent components, arrangement positions and connection modes of the constituent components, steps, order of the steps, and the like illustrated in the following exemplary embodiments are merely examples, and therefore are not intended to limit the present disclosure. Further, each of the drawings is a schematic view, and is not necessarily precisely illustrated.

Note that the comprehensive or specific aspects of the present disclosure may be implemented by a system, a method, an integrated circuit, a computer program, or a computer-readable recording medium such as a compact disk read-only memory (CD-ROM), or may be implemented by any combination of a system, a method, an integrated circuit, a computer program, and a recording medium.

FIRST EXEMPLARY EMBODIMENT

<Configuration>

FIG. 1 is a block diagram illustrating a configuration example of motor drive system 1 according to a first exemplary embodiment.

As illustrated in FIG. 1, motor drive system 1 includes motor system 10 (also referred to as motor 10 herein) and single-phase AC power source 20.

Single-phase AC power source 20 supplies a single-phase AC to motor 10. The single-phase AC supplied by single-phase AC power source 20 is, for example, a single-phase AC having an effective voltage of 100 V and a frequency of 60 Hz. Single-phase AC power source 20 may be, for example, a commercial power source.

Motor 10 is driven using the single-phase AC supplied from single-phase AC power source 20 as an electric power source. Motor 10 may be, for example, an induction motor.

As illustrated in FIG. 1, motor 10 includes first terminal 11, second terminal 12, third terminal 13, AC/DC converter 30, inverter 40, winding wire 50, rotor 60, controller 70, storage part 71, updating part 72, operation receiving part 73, and detection circuit 80.

First terminal 11 and second terminal 12 are terminals to which a single-phase AC supplied from single-phase AC power source 20 is input, and are connected to AC/DC converter 30.

Third terminal 13 is a terminal that (1) is short-circuited with first terminal 11, (2) is short-circuited with second terminal 12, or (3) is in an open state, and is connected to detection circuit 80. Third terminal 13 may be in a state other than these states. These states of third terminal 13 may be selectively realized by, for example, a relay (not illustrated) connected outside motor 10.

Each of first terminal 11, second terminal 12, and third terminal 13 is made of a material having conductivity Each of first terminal 11, second terminal 12, and third terminal 13 may be realized by, for example, a metal connector or a lead wire.

AC/DC converter 30 converts a single-phase AC supplied by single-phase AC power source 20 into a DC. More specifically, AC/DC converter 30 includes one or more diodes (here, four diodes) and one or more capacitors (here, one capacitor), rectifies a single-phase AC by one or more diodes, and converts the single-phase AC into a DC by smoothing the rectified pulsating flow by the one or more capacitors.

Inverter 40 is PWM-controlled by a pulse width modulation (PWM) signal to convert the DC converted by AC/DC converter 30 into a three-phase AC. More specifically, inverter 40 includes a plurality of switching elements (here, six switching elements) that performs a switching operation, and the plurality of switching elements are PWM-controlled by a PWM signal output from controller 70 to be described later, thereby converting the DC converted by AC/DC converter 30 into a three-phase AC including a U phase, a V phase, and a W phase.

The three-phase AC converted by inverter 40 is supplied to winding wire 50 to generate a magnetic field that rotates rotor 60. More specifically, winding wire 50 includes a coil connected to the U phase, a coil connected to the V phase, and a coil connected to the W phase, which are Y-connected to each other. By changing the currents flowing through these three coils, a magnetic field for rotating rotor 60 is generated. Winding wire 50 may be, for example, a Δ connection.

Rotor 60 is rotated by a magnetic field generated in winding wire 50. Rotor 60 is rotatable about a rotation axis in one of a first rotation direction and a second rotation direction opposite to the first rotation direction. The rotation speed and the rotation direction of rotor 60 change according to the magnetic field generated in winding wire 50. That is, the rotation speed and the rotation direction of rotor 60 change according to the three-phase AC converted by inverter 40.

In a state where a single-phase AC is input to first terminal 11 and second terminal 12, detection circuit 80 (1) outputs a first detection signal when third terminal 13 is short-circuited to first terminal 11, (2) outputs a second detection signal when third terminal 13 is short-circuited to second terminal 12, and (3) outputs a third detection signal when third terminal 13 is in an open state.

Hereinafter, a specific circuit configuration example of detection circuit 80 will be described with reference to the drawings.

As illustrated in FIG. 1, detection circuit 80 includes diode 81, diode 82, NPN transistor 83 (hereinafter, it is also simply referred to as a transistor 83), NPN transistor 84 (hereinafter, it is also simply referred to as a transistor 84), resistance element 85, resistance element 86, resistance element 87, resistance element 88, resistance element 89, resistance element 90, control power source 91, detection signal line 101, and detection signal line 102.

Diode 81 has an anode connected to first terminal 11, and rectifies a single-phase AC input from single-phase AC power source 20 to first terminal 11.

Resistance element 85 and resistance element 87 are connected in series between the cathode of diode 81 and the ground, and divide the potential of the cathode of diode 81.

Control power source 91 supplies a potential for pulling up detection signal line 101 and detection signal line 102. Here, as an example, the potential is 5 V. Control power source 91 may include, for example, a DC/DC converter (not illustrated), and the DC/DC converter may supply a potential by converting the DC potential converted by AC/DC converter 30.

Resistance element 89 is connected to control power source 91 and detection signal line 101, and pulls up detection signal line 101 to the control potential.

Transistor 83 is an open collector output, the base and the emitter are connected to one terminal and the other terminal of resistance element 87, respectively, and the collector is connected to detection signal line 101. Transistor 83 brings detection signal line 101 and the ground into a conductive state when a potential difference between one terminal and the other terminal of resistance element 87, that is, a divided potential of the potential of the anode of diode 81 is larger than a threshold (for example, 0.6 V), and brings detection signal line 101 and the ground into a non-conductive state when the potential difference is smaller than the threshold.

Here, the resistance value of transistor 83 in the ON state is sufficiently smaller than the resistance value of resistance element 89. Therefore, when transistor 83 is in the ON state, the potential of detection signal line 101 substantially becomes the ground potential (that is, substantially 0 V). Therefore, the potential of detection signal line 101 is the potential pulled up by resistance element 89 when transistor 83 is in the OFF state, and is substantially the ground potential when transistor 83 is in the ON state, Therefore, the potential of detection signal line 101 becomes a high level (that is, the control potential) when the divided potential of the pulsating flow rectified by diode 81 is smaller than the threshold, and becomes a low level (that is, substantially the ground potential) when the divided potential is larger than the threshold.

Figure 2A:
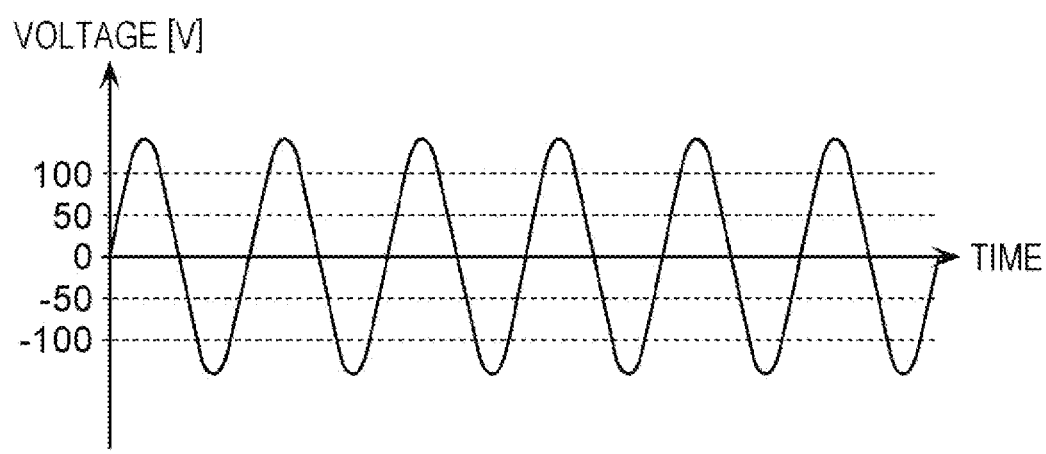
FIG. 2A is a waveform diagram of a single-phase AC supplied from a single-phase AC power source.
Figure 2B:
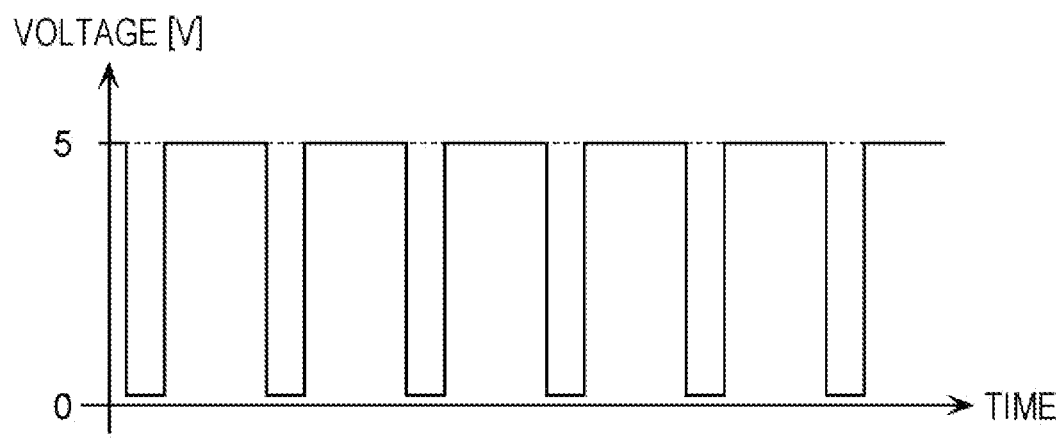
FIG. 2B is a waveform diagram of a detection signal line.

FIG. 2A is a waveform diagram of a single-phase AC supplied from single-phase AC power source 20. FIG. 2B is a waveform diagram of detection signal line 101.

As illustrated in FIG. 2B, the potential of detection signal line 101 is a pulse signal that alternately repeats a high level and a low level at the same cycle as the cycle of the single-phase AC.

Diode 82 is an element similar to diode 81. Diode 82 has the anode connected to third terminal 13 and (1) rectifies the single-phase AC input from single-phase AC power source 20 to first terminal 11 when third terminal 13 is short-circuited to first terminal 11, and (2) rectifies the single-phase AC input from single-phase AC power source 20 to second terminal 12 when third terminal 13 is short-circuited to second terminal 12.

Resistance element 86 and resistance element 88 are elements similar to resistance element 85 and resistance element 87, respectively. Resistance element 86 and resistance element 88 are connected in series to the cathode of diode 81, and divide the potential of the cathode of diode 81.

Resistance element 90 is an element similar to resistance element 89. Resistance element 90 is connected to control power source 91 and detection signal line 102, and pulls up detection signal line 102 to the control potential.

Transistor 84 is an element similar to transistor 83. Transistor 84 is an open collector output, the base and the emitter are connected to one terminal of resistance element 88 and the other terminal of resistance element 88, respectively, and the collector is connected to detection signal line 102. Transistor 84 brings detection signal line 102 into conduction with the ground when a potential difference between one terminal of resistance element 88 and the other terminal of resistance element 88, that is, a divided potential of the potential of the anode of diode 82 is larger than a threshold (for example, 0.6 V), and brings detection signal line 102 into non-conduction with the ground when the potential difference is smaller than the threshold.

Here, the resistance value of transistor 84 in the ON state is sufficiently smaller than the resistance value of resistance element 90. Therefore, when transistor 84 is in the ON state, the potential of detection signal line 102 substantially becomes the ground potential (that is, substantially 0 V). Therefore, the potential of detection signal line 102 becomes the control potential when transistor 84 is in the OFF state, and substantially becomes the ground potential when transistor 84 is in the ON state.

Therefore, the potential of detection signal line 102 becomes a high level (that is, the control potential) when the divided potential of the pulsating flow rectified by diode 82 is smaller than the threshold, and becomes a low level (that is, substantially the ground potential) when the divided potential is larger than the threshold.

In a case where third terminal 13 is short-circuited to first terminal 11, the potential of detection signal line 102 is a pulse signal that alternately repeats a high level and a low level at the same cycle as the cycle of the single-phase AC, which is similar to the potential of detection signal line 101. This is because the potential of the cathode of diode 82 becomes the same potential as the potential of the cathode of diode 81 because third terminal 13 is short-circuited to first terminal 11.

Therefore, when third terminal 13 is short-circuited to first terminal 11, the potential of detection signal line 102 has the same waveform as the potential of detection signal line 101. Therefore, FIG. 2B is also a waveform diagram of detection signal line 102 when third terminal 13 is short-circuited to first terminal 11.

Figure 3A:
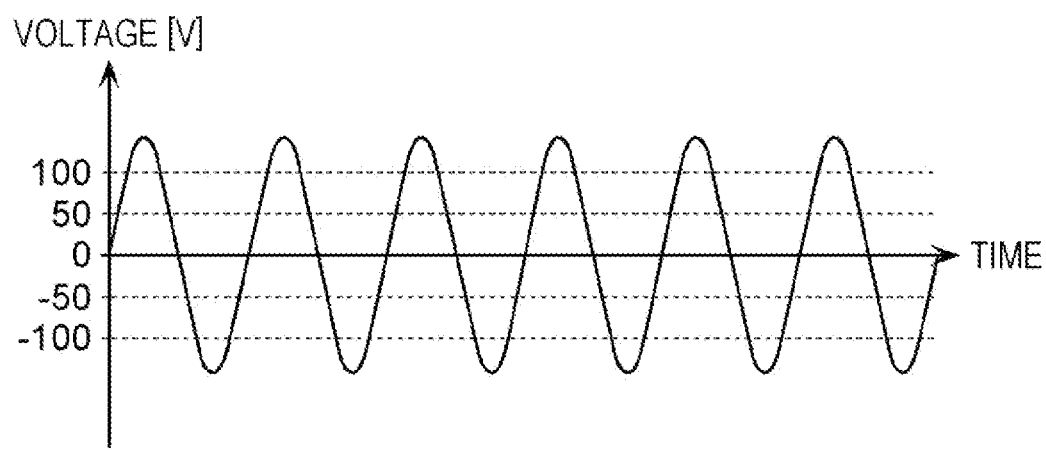
FIG. 3A is a waveform diagram of a single-phase AC supplied from a single-phase AC power source.
Figure 3B:
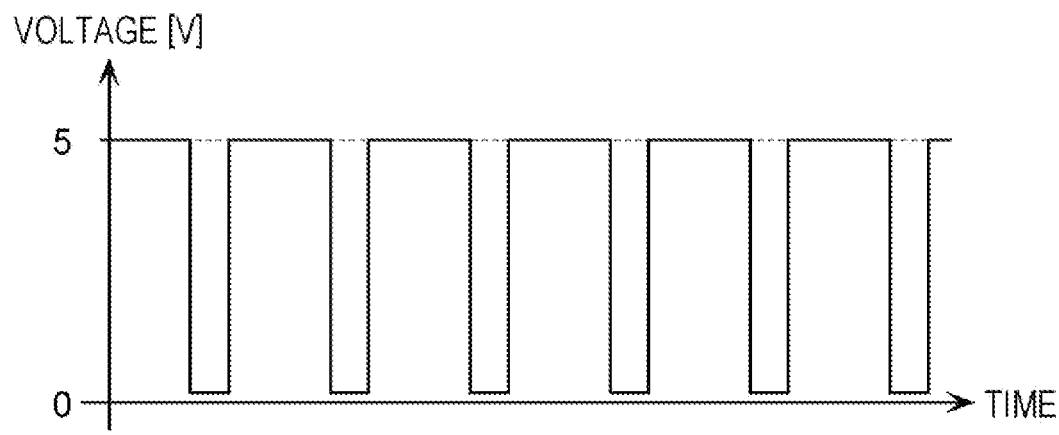
FIG. 3B is a waveform diagram of the detection signal line in a state where a third terminal is short-circuited to a second terminal.

FIG. 3A is a waveform diagram of a single-phase AC supplied from single-phase AC power source 20. FIG. 3B is a waveform diagram of detection signal line 102 in a state where third terminal 13 is short-circuited to second terminal 12.

As illustrated in FIG. 3B, in the state in which third terminal 13 is short-circuited to second terminal 12, the potential of detection signal line 102 is a pulse signal that is opposite in phase to the potential of detection signal line 101 and alternately repeats the high level and the low level in the same cycle as the cycle of the single-phase AC. This is because the potential of the cathode of diode 82 is opposite in phase to the potential of the cathode of diode 81 because third terminal 13 is short-circuited to second terminal 12.

Figure 4A:
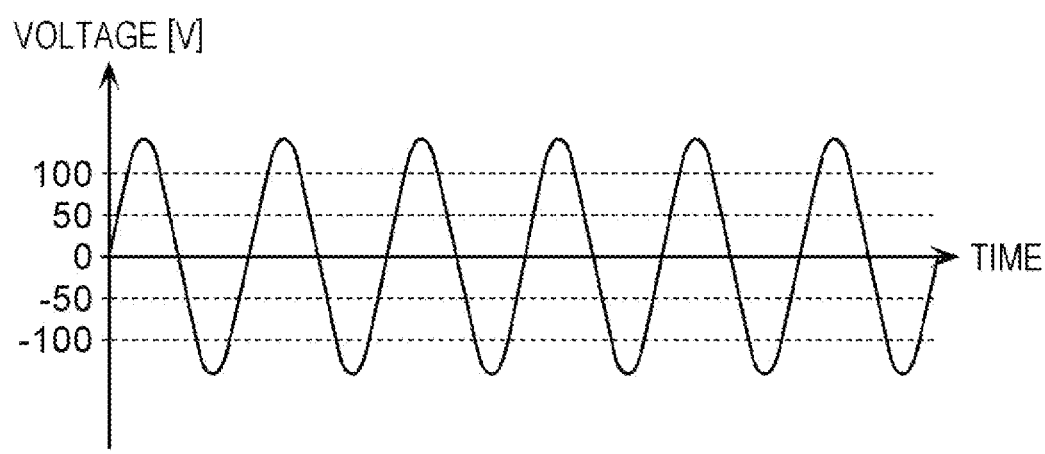
FIG. 4A is a waveform diagram of a single-phase AC supplied from a single-phase AC power source.
Figure 4B:
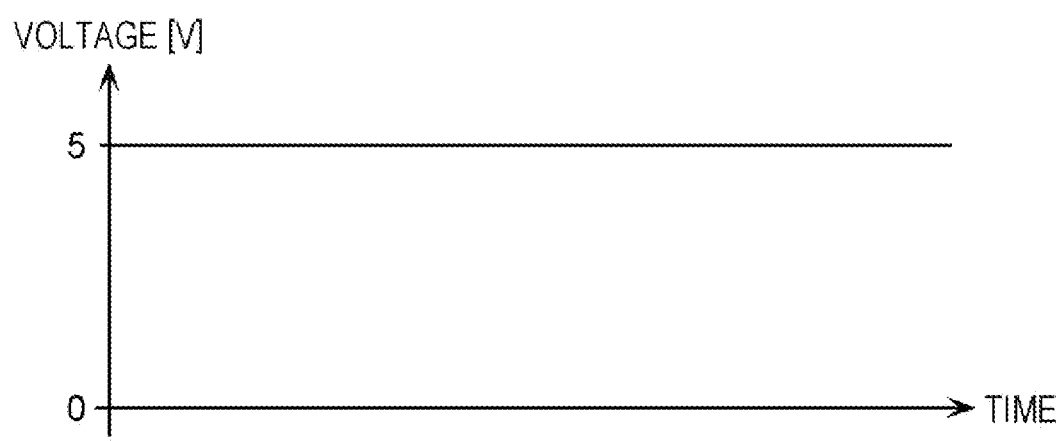
FIG. 4B is a waveform diagram of the detection signal line when the third terminal is in the open state.

FIG. 4A is a waveform diagram of a single-phase AC supplied from single-phase AC power source 20. FIG. 4B is a waveform diagram of detection signal line 102 when third terminal 13 is in the open state.

As illustrated in FIG. 4B, when third terminal 13 is in the open state, the potential of detection signal line 102 remains at the high level and becomes a signal that does not change. This is because third terminal 13 is in the open state. This is because when both the one terminal of resistance element 88 and the other terminal of resistance element 88 are at the ground potential, the one terminal of resistance element 88 and the other terminal of resistance element 88 are at the same potential, and transistor 84 remains in the OFF state without any change.

With the above configuration, detection circuit 80 outputs the first detection signal, the second detection signal, and the third detection signal from the two detection signal lines of detection signal line 101 and detection signal line 102. Here, specifically, the first detection signal is a pulse signal in which detection signal line 101 and detection signal line 102 alternately repeat the high level and the low level at the same cycle as the cycle of the single-phase AC, the phases of which are the same as each other. Specifically, the second detection signal is a pulse signal in which detection signal line 101 and detection signal line 102 alternately repeat the high level and the low level in the same cycle as the cycle of the single-phase AC in which the phases are opposite to each other. Specifically, the third detection signal is a pulse signal in which detection signal line 101 alternately repeats the high level and the low level in the same cycle as the cycle of the single-phase AC, and detection signal line 102 remains at the high level without any change.

Returning to FIG. 1 again, the description of motor 10 will be continued.

Controller 70 outputs a PWM signal to inverter 40. More specifically, controller 70 outputs the PWM signal so that rotor 60 is in the first rotation state when detection circuit 80 outputs the first detection signal, rotor 60 is in the second rotation state when detection circuit 80 outputs the second detection signal, and rotor 60 is in the third rotation state when detection circuit 80 outputs the third detection signal.

Here, the first rotation state, the second rotation state, and the third rotation state may be any rotation state of rotor 60 as long as the rotation state of rotor 60 is different from each other. For example, the first rotation state may be a state in which rotor 60 rotates at a first rotation speed in a first rotation direction, the second rotation state may be a state in which rotor 60 rotates at a second rotation speed higher than the first rotation speed in the first rotation direction, and the third rotation state may be a state in which rotor 60 rotates in a second rotation direction opposite to the first rotation direction. For example, the first rotation state may be a state in which rotor 60 rotates in the first rotation direction at the first rotation speed, the second rotation state may be a state in which rotor 60 rotates in the first rotation direction at the second rotation speed higher than the first rotation speed, and the third rotation state may be a state in which rotor 60 rotates in the first rotation direction at a third rotation speed higher than the second rotation speed. Controller 70 may be implemented by, for example, a microcomputer (not illustrated) incorporated in motor 10 executing a program stored in a memory (not illustrated) incorporated in motor 10.

Storage part 71 stores PWM information defining the waveform of the PWM signal output from controller 70. That is, controller 70 outputs the PWM signal based on the PWM information stored in storage part 71. Storage part 71 may be realized by, for example, a memory (not illustrated) built in motor 10.

Operation receiving part 73 receives an operation from a user who uses motor drive system 1. The operation received by operation receiving part 73 includes an operation for updating the PWM signal. Operation receiving part 73 may be realized by, for example, a touch panel, a keyboard, a switch, or the like. Operation receiving part 73 may include, for example, an interface circuit capable of communicating with an external device (for example, a personal computer), and receive a signal generated by the external device and based on an operation by the user for updating the PWM signal from the external device, thereby receiving the operation from the user.

Updating part 72 updates the PWM signal stored in storage part 71 on the basis of the operation from the user received by operation receiving part 73. Updating part 72 may be realized, for example, by a microcomputer (not illustrated) built in motor 10 executing a program stored in a memory (not illustrated) built in motor 10.

As described above, motor 10 of the present exemplary embodiment includes first terminal 11 and second terminal 12 to which a single-phase AC is input, third terminal 13, AC/DC converter 30 that is connected to first terminal 11 and second terminal 12 and converts the single-phase AC into a DC, inverter 40 that is subjected to pulse width modulation control (PWM control) by a pulse width modulation signal (PWM signal) to convert the DC into a three-phase AC, winding wire 50 to which the three-phase AC is supplied, rotor 60 that rotates by the magnetic field generated in winding wire 50, controller 70 that outputs a PWM signal to the inverter, and detection circuit 80 connected to the third terminal, in which in a state where the single-phase AC is input to first terminal 11 and second terminal 12, detection circuit 80 (1) outputs the first detection signal when third terminal 13 is short-circuited to first terminal 11, (2) output the second detection signal when third terminal 13 is short-circuited to second terminal 12, and (3) outputs the third detection signal when third terminal 13 is in the open state, and controller 70 outputs the PWM signal such that rotor 60 is in the first rotation state when detection circuit 80 outputs the first detection signal, rotor 60 is in the second rotation state when detection circuit 80 outputs the second detection signal, and rotor 60 is in the third rotation state when detection circuit 80 outputs the third detection signal.

As a result, there is provided a motor capable of dynamically switching among three operation modes having different rotation states, the motor including one terminal in addition to a pair of power source terminals.

Motor 10 may further include storage part 71 that stores PWM information defining a waveform of the PWM signal, updating part 72 that updates the PWM information, and operation receiving part 73 that receives an operation of motor 10 from the user. Controller 70 may output the PWM signal on the basis of the PWM information, and updating part 72 may update the PWM information on the basis of the operation from the user received by operation receiving part 73.

<Consideration>

According to motor 10 having the above configuration, (1) third terminal 13 is short-circuited to first terminal 11, whereby rotor 60 enters the first rotation state, (2) third terminal 13 is short-circuited to second terminal 12, whereby rotor 60 enters the second rotation state, and (3) third terminal 13 is in an open state, whereby rotor 60 enters the third rotation state. As described above, according to motor 10, there is provided a motor capable of dynamically switching among three operation modes having different rotation states, the motor including one terminal (that is, third terminal 13) in addition to the pair of power source terminals (that is, first terminal 11 and second terminal 12).

The first rotation state, the second rotation state, and the third rotation state include at least a rotation state in which rotor 60 rotates in the first rotation direction and a rotation state in which rotor 60 rotates in the second rotation direction opposite to the first rotation direction, so that motor 10 can operate in operation modes in which the rotation directions of rotor 60 are opposite to each other.

Motor 10 can operate in an operation mode set by an operation to operation receiving part 73 from the user who uses motor drive system 1.

SECOND EXEMPLARY EMBODIMENT

Hereinafter, a motor drive system according to a second exemplary embodiment configured by changing a part of motor drive system 1 according to the first exemplary embodiment will be described.

Hereinafter, in the motor drive system according to the second exemplary embodiment, components similar to the components of motor drive system 1 according to the first exemplary embodiment will be denoted by the same reference numerals as those already described, detailed description thereof will be omitted, and differences from motor drive system 1 will be mainly described.

Figure 5:
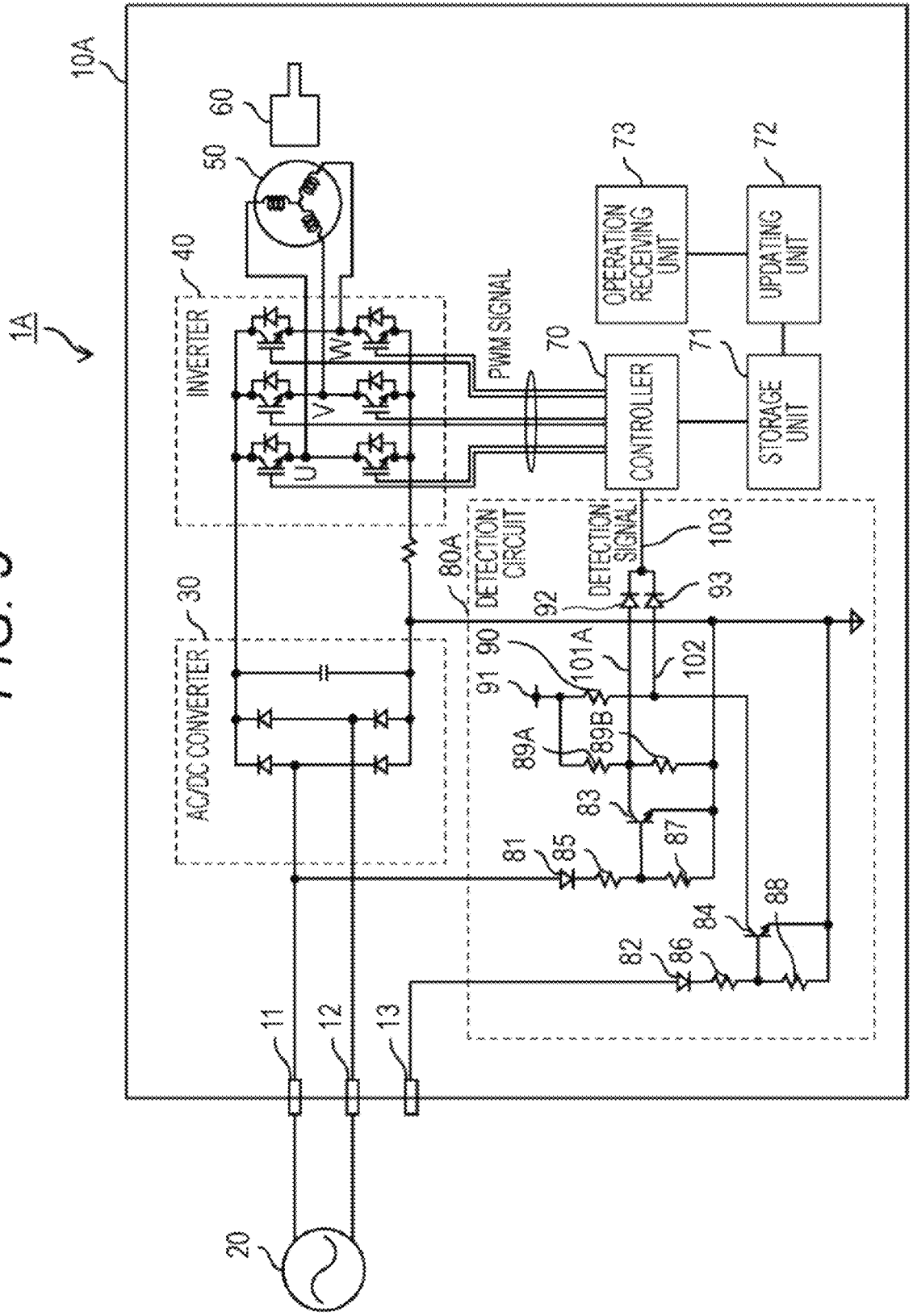
FIG. 5 is a block diagram illustrating a configuration example of a motor drive system according to a second exemplary embodiment.

FIG. 5 is a block diagram illustrating a configuration example of motor drive system 1A according to the second exemplary embodiment.

As illustrated in FIG. 5, motor drive system 1A is configured by changing motor 10 according to the first exemplary embodiment to motor 10A as compared with motor drive system 1 according to the first exemplary embodiment.

As illustrated in FIG. 5, motor 10A is configured by changing detection circuit 80 according to the first exemplary embodiment to detection circuit 80A as compared with motor 10 according to the first exemplary embodiment. Hereinafter, detection circuit 80A will be mainly described.

As illustrated in FIG. 5, detection circuit 80A is different from detection circuit 80 according to the first exemplary embodiment in that resistance element 89 according to the first exemplary embodiment is changed to resistance element 89A and resistance element 89B. Detection signal line 101 according to the first exemplary embodiment is changed to detection signal line 101A. Diode 92, diode 93, and detection signal line 103 are added.

Resistance element 89A and resistance element 89B are connected in series between control power source 91 and the ground to divide the control potential. Here, as an example, the resistance value of resistance element 89A is equal to the resistance value of resistance element 89B. Therefore, the potential which is divided (hereinafter, also referred to as a "divided potential") is 2.5 V.

A connection point between resistance element 89A and resistance element 89B is also connected to detection signal line 101A. Therefore, resistance element 89A and resistance element 89B convert detection signal line 101A into a divided potential.

Therefore, the potential of detection signal line 101A becomes a middle level (that is, a divided potential) when the divided potential of the pulsating flow rectified by diode 81 is smaller than the threshold, and becomes a low level (that is, substantially ground potential) when the divided potential is larger than the threshold.

Figure 6A:
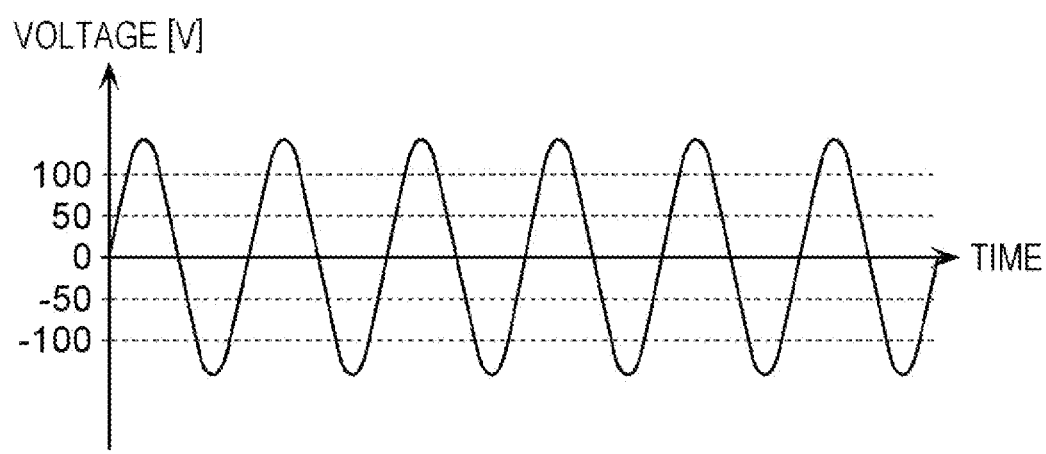
FIG. 6A is a waveform diagram of a single-phase AC supplied from a single-phase AC power source.
Figure 6B:
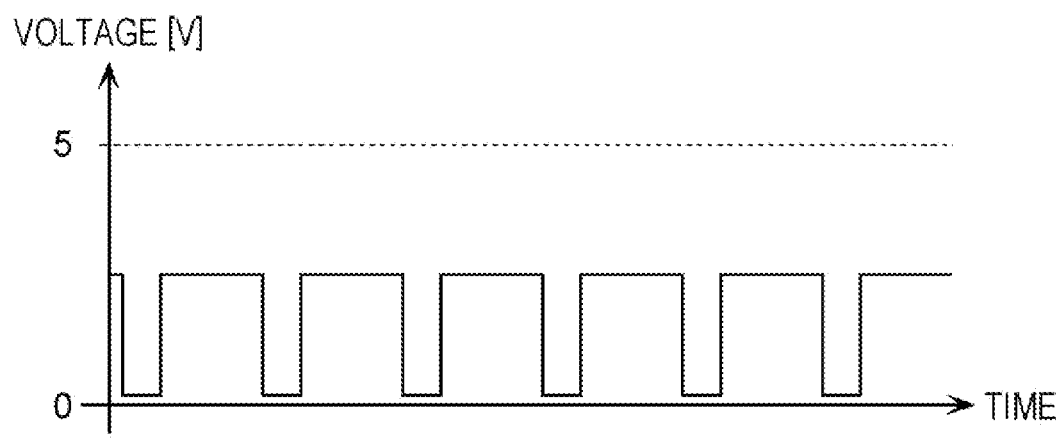
FIG. 6B is a waveform diagram of a detection signal line.

FIG. 6A is a waveform diagram of a single-phase AC supplied from single-phase AC power source 20. FIG. 6B is a waveform diagram of detection signal line 101A.

As illustrated in FIG. 6B, the potential of detection signal line 101A is a pulse signal that alternately repeats a middle level and a low level in the same cycle as the cycle of the single-phase AC.

Diode 92 has an anode connected to detection signal line 101A and a cathode connected to detection signal line 103. Diode 93 has an anode connected to detection signal line 102 and a cathode connected to detection signal line 103. That is, diode 92 and diode 93 are connected in parallel so that anodes are connected to each other.

Diode 92 and diode 93 connected in parallel in this manner function as a wired OR circuit in which detection signal line 101A and detection signal line 102 are input and detection signal line 103 is output. That is, diode 92 and diode 93 output, to detection signal line 103, a potential that is not small between the potential of detection signal line 101A and the potential of detection signal line 102.

As described above in the first exemplary embodiment, the potential of detection signal line 102 when third terminal 13 is short-circuited to first terminal 11 is a pulse signal that alternately repeats the high level and the low level in the same cycle as the cycle of the single-phase AC illustrated in FIG. 2B. Therefore, the potential of detection signal line 103 in the state in which third terminal 13 is short-circuited to first terminal 11 is a potential that is not small among the pulse signal that alternately repeats the middle level and the low level in the same cycle as the cycle of the single-phase AC illustrated in FIG. 6B and the pulse signal that alternately repeats the high level and the low level in the same cycle as the cycle of the single-phase AC illustrated in FIG. 2B. Therefore, the potential of detection signal line 103 when third terminal 13 is short-circuited to first terminal 11 becomes a pulse signal that alternately repeats a high level and a low level at the same cycle as the cycle of the single-phase AC illustrated in FIG. 2B. Therefore, FIG. 2B is also a waveform diagram of detection signal line 102 in a state where third terminal 13 is short-circuited to first terminal 11 in the second exemplary embodiment.

As described above in the first exemplary embodiment, the potential of detection signal line 102 in the state in which third terminal 13 is short-circuited to second terminal 12 becomes the pulse signal that alternately repeats the high level and the low level in the same cycle as the cycle of the single-phase AC of the opposite phase to the potential of detection signal line 101A illustrated in FIG. 3B. Therefore, the potential of detection signal line 103 in the state in which third terminal 13 is short-circuited to second terminal 12 is a potential that is not small between the pulse signal that alternately repeats the middle level and the low level in the same cycle as the cycle of the single-phase AC illustrated in FIG. 6B and the pulse signal that alternately repeats the high level and the low level in the same cycle as the cycle of the single-phase AC of the opposite phase to the potential of detection signal line 101A illustrated in FIG. 3B. Therefore, the potential of detection signal line 103 in the state where third terminal 13 is short-circuited to first terminal 11 is a pulse signal that is opposite in phase to the potential of detection signal line 101A and alternately repeats the high level and the middle level in the same cycle as the cycle of the single-phase AC.

Figure 7A:
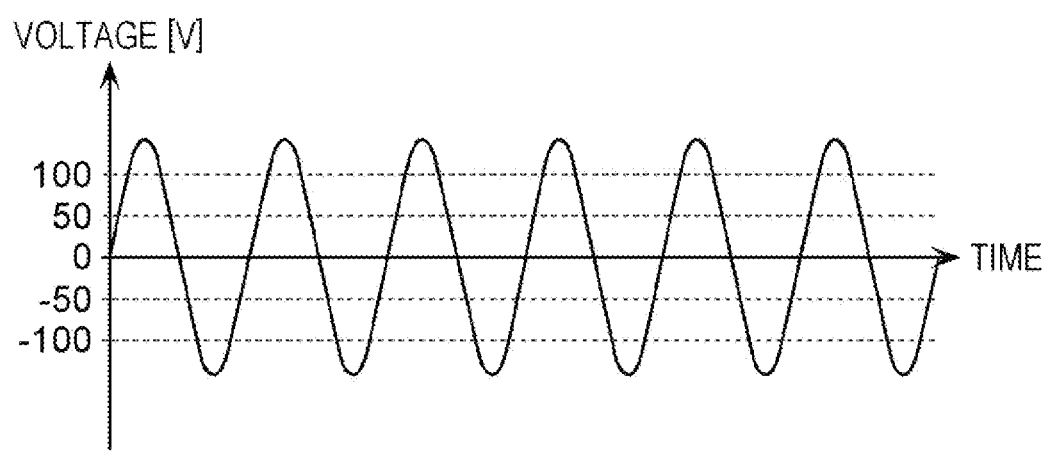
FIG. 7A is a waveform diagram of a single-phase AC supplied from a single-phase AC power source.
Figure 7B:
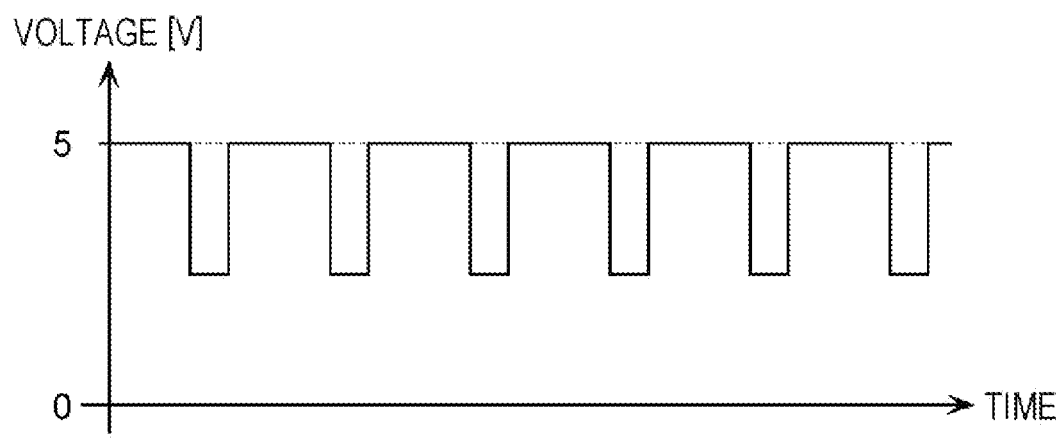
FIG. 7B is a waveform diagram of the detection signal line in a state where the third terminal is short-circuited to the second terminal.

FIG. 7A is a waveform diagram of a single-phase AC supplied from single-phase AC power source 20. FIG. 7B is a waveform diagram of detection signal line 103 in a state where third terminal 13 is short-circuited to second terminal 12.

As described above in the first exemplary embodiment, the potential of detection signal line 102 when third terminal 13 is in the open state is a signal that does not change while being at the high level as illustrated in FIG. 4B. Therefore, the potential of detection signal line 103 when third terminal 13 is in the open state is a potential that is not small in the pulse signal that alternately repeats the middle level and the low level at the same cycle as the cycle of the single-phase AC illustrated in FIG. 6B and the signal that does not change while being at the high level illustrated in FIG. 4B. Therefore, the potential of detection signal line 103 when third terminal 13 is in the open state becomes a signal that remains at the high level and does not change as illustrated in FIG. 4B. Therefore, FIG. 4B is also a waveform diagram of detection signal line 103 when third terminal 13 is in the open state in the second exemplary embodiment.

With the above configuration, detection circuit 80A outputs the first detection signal, the second detection signal, and the third detection signal from one detection signal line 103. Here, the first detection signal is specifically a pulse signal that alternately repeats a high level and a low level at the same cycle as the cycle of the single-phase AC. Specifically, the second detection signal is a pulse signal that is opposite in phase to the first detection signal and alternately repeats a high level and a middle level in the same cycle as the cycle of the single-phase AC. The third detection signal is specifically a signal in which detection signal line 103 remains at the high level and does not change.

<Consideration>

According to motor 10A having the above configuration, similarly to motor 10 according to the first exemplary embodiment, there is provided a motor capable of dynamically switching among three operation modes having different rotation states, the motor including one terminal in addition to a pair of terminals for power source.

Motor 10A can operate in operation modes in which the rotation directions of rotor 60 are opposite to each other, similarly to motor 10 according to the first exemplary embodiment.

Similarly to motor 10 according to the first exemplary embodiment, motor 10A can operate in an operation mode set by an operation to operation receiving part 73 from the user who uses motor drive system 1A.

THIRD EXEMPLARY EMBODIMENT

Hereinafter, a motor drive system according to a third exemplary embodiment configured by changing a part of motor drive system 1 according to the first exemplary embodiment will be described.

Hereinafter, in the motor drive system according to the third exemplary embodiment, components similar to the components of motor drive system 1 according to the first exemplary embodiment will be denoted by the same reference numerals as those already described, detailed description thereof will be omitted, and differences from motor drive system 1 will be mainly described.

Figure 8:
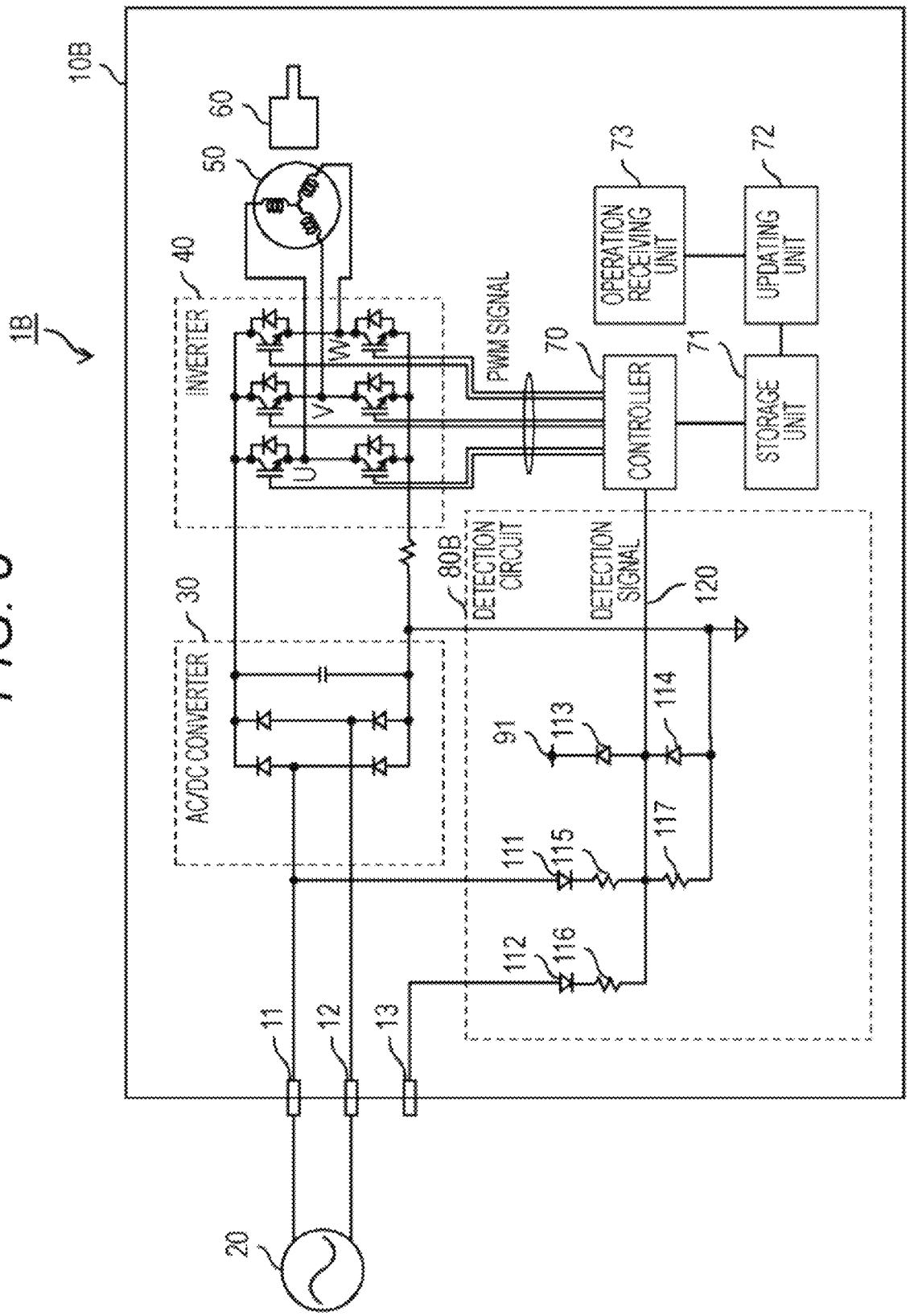
FIG. 8 is a block diagram illustrating a configuration example of a motor drive system according to a third exemplary embodiment.

FIG. 8 is a block diagram illustrating a configuration example of motor drive system 1B according to the third exemplary embodiment.

As illustrated in FIG. 8, motor drive system 1B is configured by changing motor 10 according to the first exemplary embodiment to motor 10B as compared with motor drive system 1 according to the first exemplary embodiment.

As illustrated in FIG. 8, motor 10B is configured by changing detection circuit 80 according to the first exemplary embodiment to detection circuit 80B as compared with motor 10 according to the first exemplary embodiment. Hereinafter, detection circuit 80B will be mainly described.

As illustrated in FIG. 8, detection circuit 80B includes control power source 91, diode 111, diode 112, diode 113, diode 114, resistance element 115, resistance element 116, resistance element 117, and detection signal line 120.

Diode 111 has an anode connected to first terminal 11, and rectifies a single-phase AC input from single-phase AC power source 20 to first terminal 11.

Diode 112 is an element similar to diode 111. Diode 112 has an anode connected to third terminal 13, (1) rectifies a single-phase AC input from single-phase AC power source 20 to first terminal 11 when third terminal 13 is short-circuited to the first terminal 11, and (2) rectifies a single-phase AC input from single-phase AC power source 20 to second terminal 12 when third terminal 13 is short-circuited to second terminal 12.

In resistance element 115, one terminal is connected to the cathode of diode 111, and the other terminal is connected to detection signal line 120.

Resistance element 116 is an element similar to resistance element 115. In resistance element 116, one terminal is connected to the cathode of diode 112, and the other terminal is connected to detection signal line 120. That is, resistance element 115 and resistance element 116 are connected in parallel such that the other terminals are connected to each other.

In resistance element 117, one terminal is connected to detection signal line 120, and the other terminal is connected to the ground. That is, resistance element 115 and resistance element 117 are connected in series between the cathode of diode 111 and the ground. Therefore, resistance element 115 and resistance element 117 divide the potential of the cathode of diode 111. Resistance element 116 and resistance element 117 are connected in series between the cathode of diode 112 and the ground. Therefore, resistance element 116 and resistance element 117 divide the potential of the cathode of diode 112. Therefore, the potential of detection signal line 120 is a potential obtained by superimposing (1) the potential of the cathode of diode 111 divided by resistance element 115 and resistance element 117 and (2) the potential of the cathode of diode 112 divided by resistance element 116 and resistance element 117.

Figure 9A:
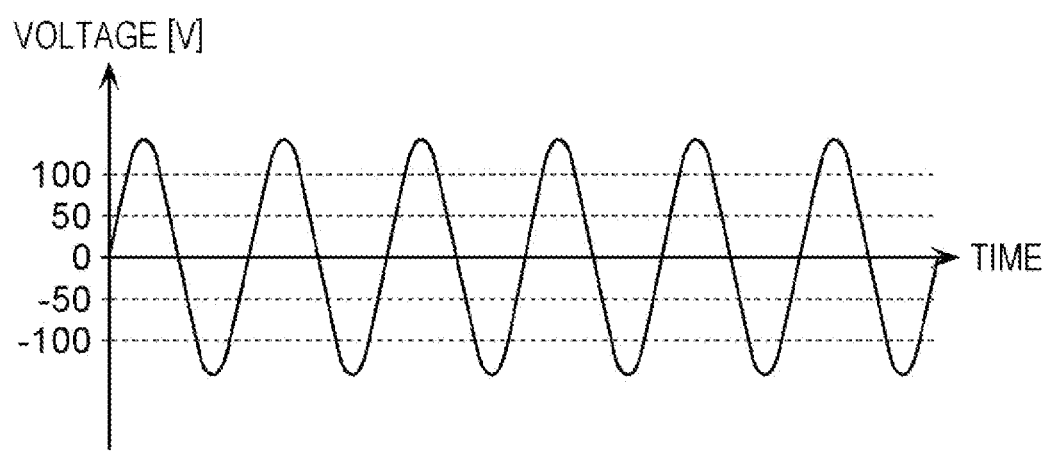
FIG. 9A is a waveform diagram of a single-phase AC supplied from a single-phase AC power source.
Figure 9B:
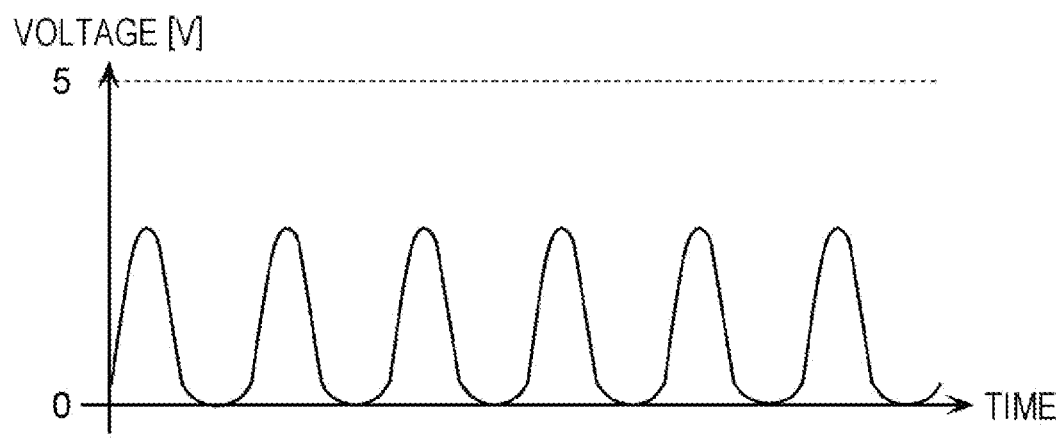
FIG. 9B is a waveform diagram of the detection signal line when third terminal 13 is in the open state.

FIG. 9A is a waveform diagram of a single-phase AC supplied from single-phase AC power source 20. FIG. 9B is a waveform diagram of detection signal line 120 when third terminal 13 is in the open state.

When third terminal 13 is in the open state, the potential of detection signal line 120 is the potential itself of the cathode of diode 111 divided by resistance element 115 and resistance element 117.

Therefore, when third terminal 13 is in the open state, the potential of detection signal line 120 becomes a potential obtained by dividing the potential of the pulsating flow half-wave rectified by diode 111 by resistance element 115 and resistance element 117 as illustrated in FIG. 9. That is, the signal of detection signal line 120 in the open state of third terminal 13 becomes a pulsating flow pulsating at the same cycle as the single-phase AC.

Figure 10A:
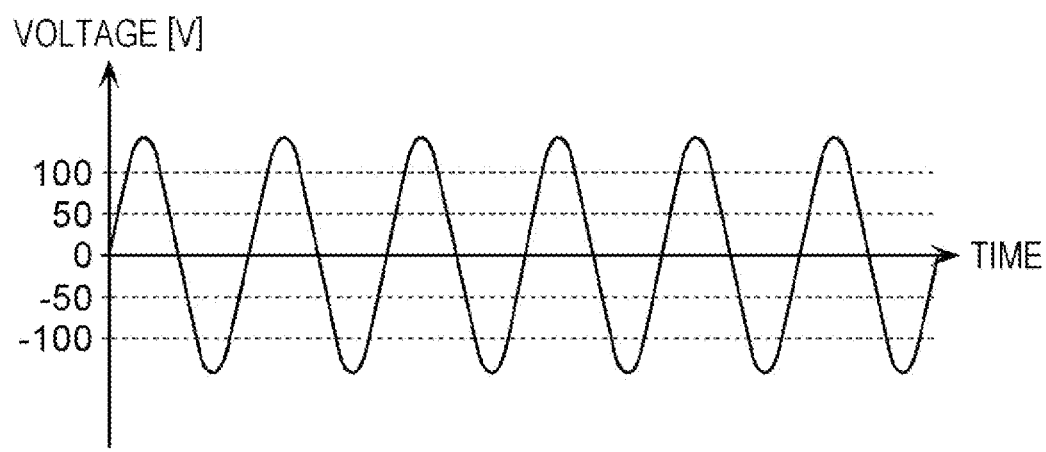
FIG. 10A is a waveform diagram of a single-phase AC supplied from a single-phase AC power source.
Figure 10B:
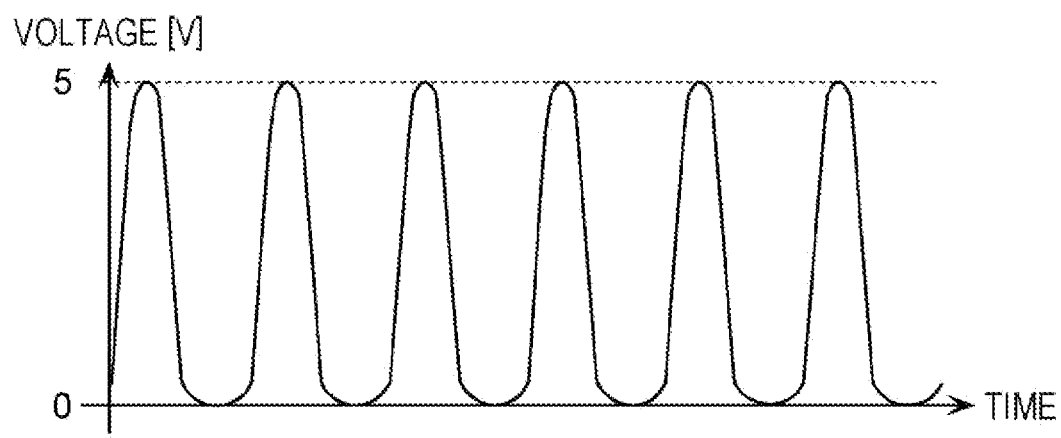
FIG. 10B is a waveform diagram of a detection signal line in a state where the third terminal is short-circuited to the first terminal.

FIG. 10A is a waveform diagram of a single-phase AC supplied from single-phase AC power source 20. FIG. 10B is a waveform diagram of detection signal line 120 in a state where third terminal 13 is short-circuited to first terminal 11.

In a state where third terminal 13 is short-circuited to first terminal 11, both diode 111 and diode 112 rectify the single-phase AC input from single-phase AC power source 20 to first terminal 11. Therefore, the pulsating flow half-wave rectified by diode 111 and the pulsating flow half-wave rectified by diode 112 have the same phase.

Therefore, in a state where third terminal 13 is short-circuited to first terminal 11, as illustrated in FIGS. 10A and 10B, the potential of detection signal line 120 is a potential in which (1) the potential obtained by dividing the potential of the pulsating flow half-wave rectified by diode 111 by resistance element 115 and resistance element 117 and (2) the potential obtained by dividing the potential of the pulsating flow half-wave rectified by diode 112 by resistance element 116 and resistance element 117 are superposed in the same phase. That is, the signal of detection signal line 120 when third terminal 13 is connected to first terminal 11 is a pulsating flow that pulsates at the same cycle as the single-phase AC.

As illustrated in FIGS. 9A, 9B, 10A, and 10B, the peak potential (hereinafter, also referred to as "high peak potential") of detection signal line 120 in the state where third terminal 13 is short-circuited to first terminal 11 is higher than the peak potential (hereinafter, also referred to as "middle peak potential") of detection signal line 120 in the open state of third terminal 13.

In a state where third terminal 13 is short-circuited to second terminal 12, diode 111 rectifies the single-phase AC input from single-phase AC power source 20 to first terminal 11. Then, diode 112 rectifies the single-phase AC input from single-phase AC power source 20 to second terminal 12. Therefore, the pulsating flow half-wave rectified by diode 111 and the pulsating flow half-wave rectified by diode 112 have phases opposite to each other.

Figure 11A:
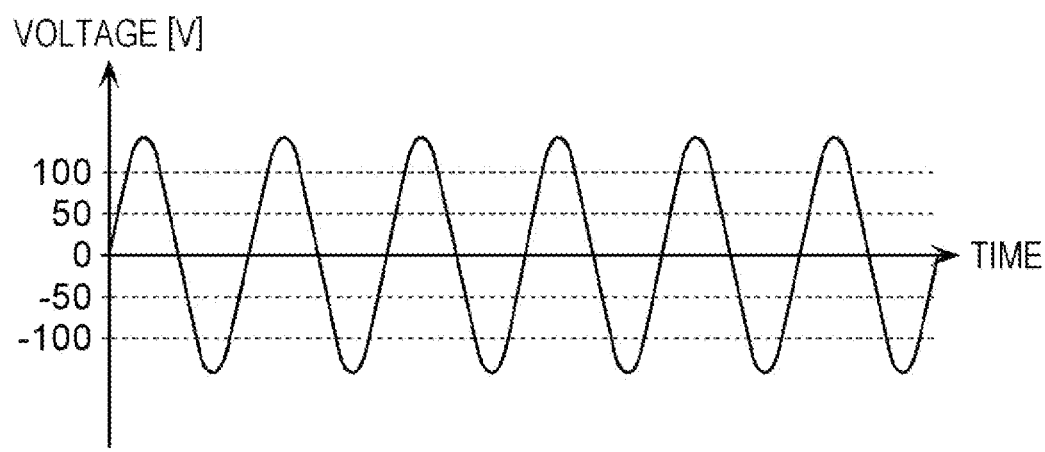
FIG. 11A is a waveform diagram of a single-phase AC supplied from a single-phase AC power source.
Figure 11B:
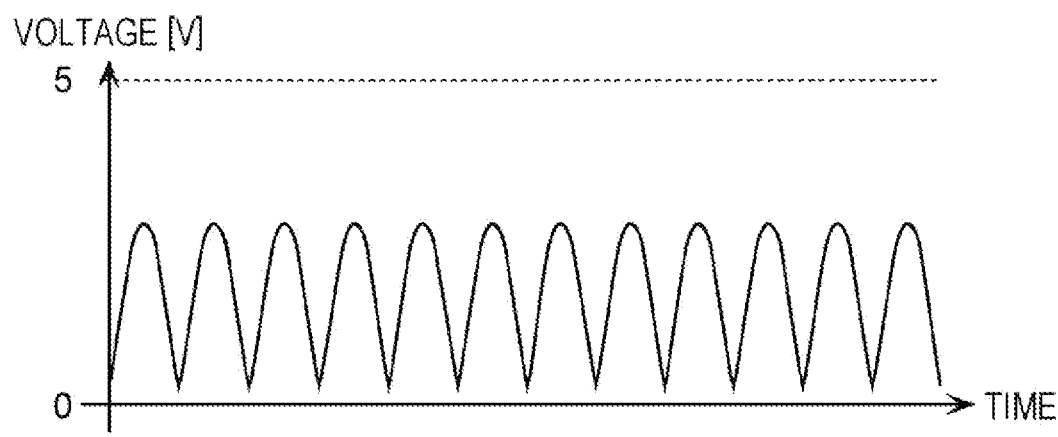
FIG. 11B is a waveform diagram of a detection signal line.

Therefore, in a state where third terminal 13 is short-circuited to second terminal 12, as illustrated in FIGS. 11A and 11B, the potential of detection signal line 120 is a potential in which (1) the potential obtained by dividing the potential of the pulsating flow half-wave rectified by diode 111 by resistance element 115 and resistance element 117 and (2) the potential obtained by dividing the potential of the pulsating flow half-wave rectified by diode 112 by resistance element 116 and resistance element 117 are superimposed in opposite phases. FIG. 11A is a waveform diagram of a single-phase AC supplied from single-phase AC power source 20. FIG. 11B is a waveform diagram of detection signal line 120. That is, the signal of detection signal line 120 in the state where third terminal 13 is connected to second terminal 12 becomes a pulsating flow that pulsates at a cycle twice as long as the single-phase AC.

With the above configuration, detection circuit 80B outputs the first detection signal, the second detection signal, and the third detection signal from one detection signal line 120. Here, specifically, the first detection signal is a pulsating signal that pulsates at the same cycle as the cycle of the single-phase AC, and the peak potential becomes a high peak potential. Specifically, the second detection signal is a pulsating signal that pulsates at a cycle twice the cycle of the single-phase AC. Specifically, the third detection signal is a pulsating signal that pulsates at the same cycle as the cycle of the single-phase AC, and the peak potential becomes the middle peak potential.

<Consideration>

According to motor 10B having the above configuration, similarly to motor 10 according to the first exemplary embodiment, there is provided a motor capable of dynamically switching among three operation modes having different rotation states, the motor including one terminal in addition to a pair of terminals for power source.

Motor 10B can operate in operation modes in which the rotation directions of rotor 60 are opposite to each other, similarly to motor 10 according to the first exemplary embodiment.

Similarly to motor 10 according to the first exemplary embodiment, motor 10B can operate in the operation mode set by the operation to operation receiving part 73 from the user who uses motor drive system 1B.

OTHER EXEMPLARY EMBODIMENTS

Although the motor drive device according to one aspect of the present disclosure has been described above based on the first, second, and third exemplary embodiments, the present disclosure is not limited to these exemplary embodiments. The present disclosure may incorporate, in one or a plurality of aspects of the present disclosure, exemplary embodiments obtained by applying various modifications conceived by persons skilled in the art and exemplary embodiments obtained by combining constituent elements in different exemplary embodiments.

INDUSTRIAL APPLICABILITY

The present disclosure is widely applicable to a motor.

REFERENCE MARKS IN THE DRAWINGS 1, 1A, 1B: motor drive system
10, 10A, 10B: motor
20: single-phase AC power source
11: first terminal
12: second terminal
13: third terminal
30: AC/DC converter
40: inverter
50: winding wire 60: rotor
70: controller
71: storage part
72: updating part
73: operation receiving part
80, 80A, 80B: detection circuit
81, 82, 92, 93, 111, 112, 113, 114: diode
83, 84: NPN transistor (transistor)
85, 86, 87, 88, 89, 89A, 89B, 90, 115, 116, 117: resistance element
91: control power source
101, 101A, 102, 103, 120: detection signal line

The invention claimed is:

1. A motor system comprising:
a first terminal and a second terminal to each of which a single-phase AC is input;
a third terminal;
an AC/DC converter that is connected to the first terminal and the second terminal and converts the single-phase AC into a DC;
an inverter configured to convert the DC into a three-phase AC by performing pulse width modulation control using a pulse width modulation signal;
a winding wire to which the three-phase AC is supplied;
a rotor configured to rotate by a magnetic field generated in the winding wire;
a controller configured to output the pulse width modulation signal to the inverter; and
a detection circuit that is connected to the third terminal, wherein
in a state where the single-phase AC is input to the first terminal and the second terminal, the detection circuit (1) outputs a first detection signal when the third terminal is short-circuited to the first terminal, (2) outputs a second detection signal when the third terminal is short-circuited to the second terminal, and (3) outputs a third detection signal when the third terminal is in an open state, and
the controller outputs the pulse width modulation signal, the rotor being in a first rotation state when the detection circuit outputs the first detection signal, the rotor being in a second rotation state when the detection circuit outputs the second detection signal, and the rotor being in a third rotation state when the detection circuit outputs the third detection signal.

2. The motor system according to claim 1, wherein the first rotation state, the second rotation state, and the third rotation state include at least a rotation state in which the rotor rotates in a first rotation direction and a rotation state in which the rotor rotates in a second rotation direction opposite to the first rotation direction.

3. The motor system according to claim 1, wherein
the first rotation state is a state in which the rotor rotates at a first rotation speed in a first rotation direction,
the second rotation state is a state in which the rotor rotates in the first rotation direction at a second rotation speed higher than the first rotation speed, and
the third rotation state is a state in which the rotor rotates in a second rotation direction opposite to the first rotation direction.

4. The motor system according to claim 1, further comprising:
a storage part configured to store pulse width modulation information defining a waveform of the pulse width modulation signal;
an updating part configured to update the pulse width modulation information; and
an operation receiving part configured to receive an operation of the motor system from a user, wherein
the controller outputs the pulse width modulation signal based on the pulse width modulation information, and
the updating part updates the pulse width modulation information based on an operation from the user received by the operation receiving part.

\* \* \* \* \*